united States Patent Office 3,457,592
Patented July 29, 1969

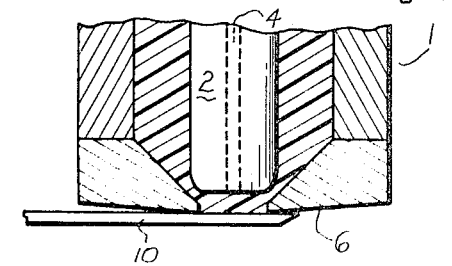
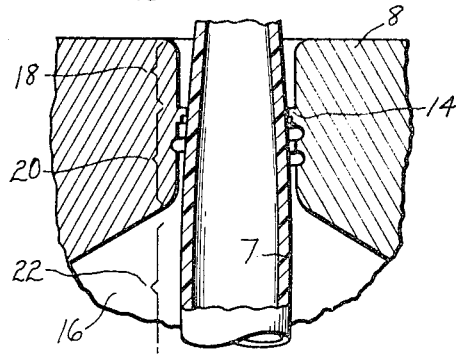
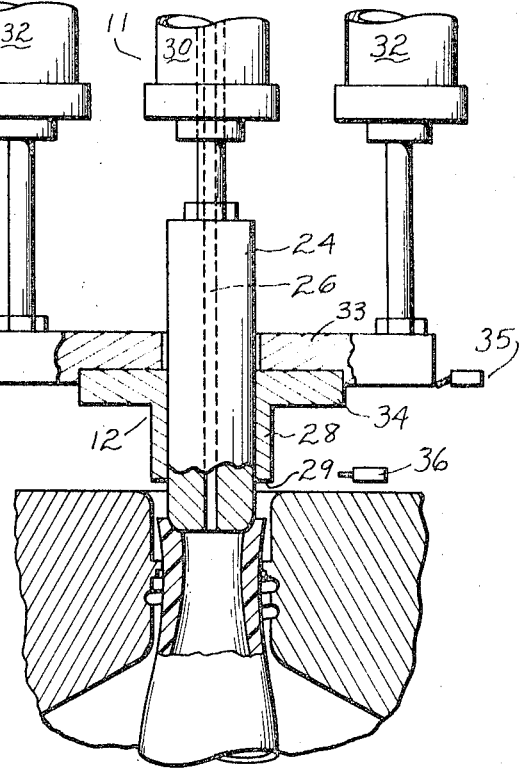
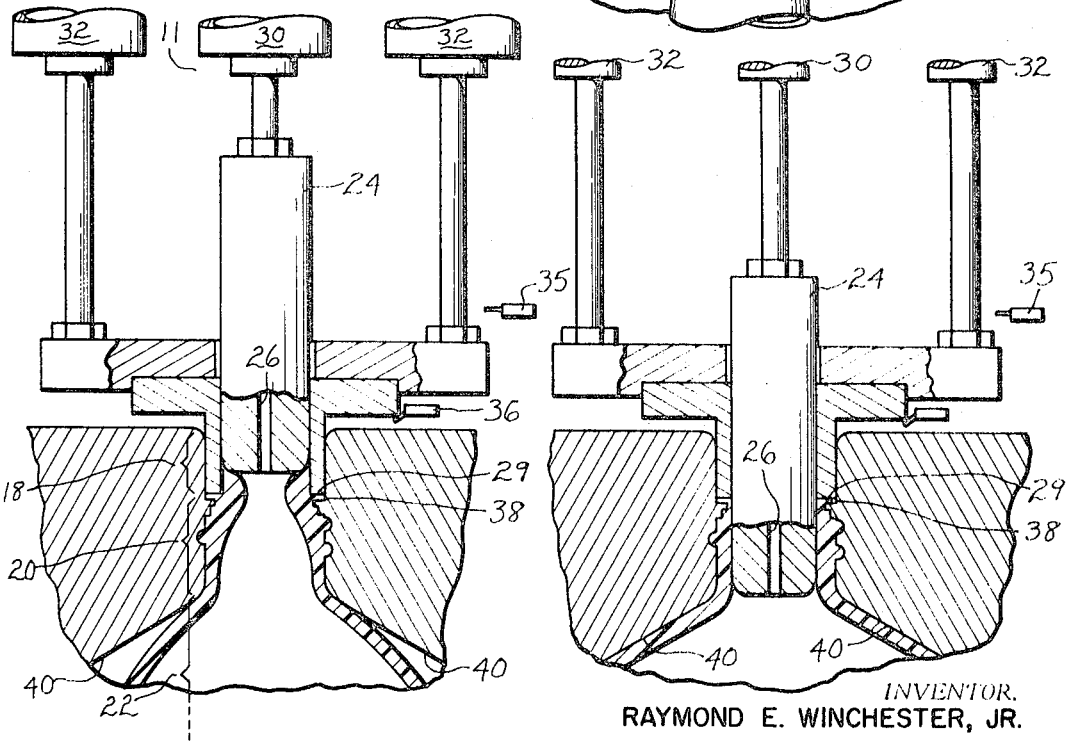
FIG. I  FIG. II  FIG. III  FIG. IV
INVENTOR.
RAYMOND E. WINCHESTER, JR.
BY James C. Logomasini
ATTORNEY:

3,457,592
APPARATUS FOR MANUFACTURING
THERMOPLASTIC ARTICLES
Raymond E. Winchester, Jr., Pawcatuck, Conn., assignor to Monsanto Company, St. Louis, Mo., a corporation of Delaware
Original application Nov. 13, 1963, Ser. No. 323,420, now Patent No. 3,272,896, dated Sept. 13, 1966. Divided and this application Jan. 3, 1967, Ser. No. 606,791
The portion of the term of the patent subsequent to Sept. 13, 1983, has been disclaimed
Int. Cl. B29c 17/07
U.S. Cl. 18—5                               9 Claims

ABSTRACT OF THE DISCLOSURE

An apparatus for restricting axial and rotational movement of a parison during press molding and blow molding, having an annular gripping rim in the mold neck, and an axially movable mandrel and coaxial collar independently operable relative to each other.

This application is a division of copending application Ser. No. 323,420 filed Nov. 13, 1963 now Patent No. 3,272,896.

This invention relates to improvements in apparatus for manufacturing blown thermoplastic articles.

In the past, the plastic working industry has provided apparatus for forming blown plastic bottles and the like by longitudinally compressing a parison and thereby press molding the bottle neck portion prior to blow molding the base portion. Such apparatus usually includes a mandrel having an enlarged shoulder portion adapted to be introduced into a parison holding, multiple section mold having a recessed top portion or cavity adapted to receive the shoulder portion of the mandrel. The advantages of so forming a plastic bottle neck portion are significant in that a thicker neck portion may be provided, the upper extremity or face of the neck portion is press molded in a finished form thereby eliminating the need for subsequent cutting and the like, and the internal diameter of the neck portion is finished formed in a smooth condition. However, in a high speed operation this method of forming blown plastic bottles is not without drawbacks. For example, it has been desirable to tightly close the multiple section mold on the parison in order to prohibit axial movement of the overall parison during the longitudinal compression and press molding of the upper portion thereof. Such a tight closure and subsequent longitudinal compression tended to form an undesirable amount of flash on the bottle. Further, if axial slippage of the parison did occur, it was difficult to achieve uniform bottle wall thickness. This possibility has been particularly problematical when a rotary motion is also imparted to an axially progressing mandrel.

It is an object of the invention to provide an apparatus for axially compressing and press molding a portion of a parison while controlling axial movement of an entire parison.

It is a further object of this invention to provide an apparatus for press molding a plastic bottle or the like with a finished upper face and a smooth internal diameter but wherein flash is reduced and uniformity in wall thickness is increased.

It is still another object of this invention to provide an apparatus whereby the upper face of a parison may be finished formed by longitudinal compression thereof but the remaining portion of the neck portion is press-molded by the generation of radial forces.

In achieving these and other objects which will appear hereinafter, this invention provides for extruding a parison from an extrusion nozzle, gripping a reduced area of the parison in a mold, injecting a small charge of air into said parison prior to severance from said extrusion nozzle, utilizing a composite mandrel for axially compressing a portion of said parison and for forming a lip thereon, and press-molding said portion by the generation of radial forces while blow-molding another portion of said parison.

A preferred embodiment of the present invention is illustrated in the accompanying drawing, in which:

FIGURE I is a schematic, vertical, sectional view representing this inventive apparatus at an early stage of the present inventive process;

FIGURE II is a schematic, vertical, sectional view on this invention in an intermediate stage after initial longitudinal compression of a parison.

FIGURE III is a schematic, vertical, sectional view of this invention in a subsequent phase after longitudinal compression of a parison is completed and press-molding of one portion and blow molding of another portion of the parison is initiated; and FIGURE IV is a schematic, vertical, sectional view of this invention at the completion of the press and blow molding cycle.

Referring in more detail to FIGURE I of the drawings, there is provided an extrusion head or nozzle 1 comprising an orifice tip 2 having a longitudinal air passage 4 and an orifice ring 6 through which plasticized material, for example, polyethelene, is extruded in a tubular form. The tubular material or parison 7 is received in a cavity of a multisection mold 8 and the mold closed thereon to close the lower end of the parison (not shown) in the usual manner. Prior to severance of the parison 7 from the nozzle 1 by a knife 10 or the like, and in order to stabilize the parison in the multisection mold 8, a small charge of air may be injected internally of the parison through the air passage 4 in the orifice tip 2. This air injection slightly enlarges the diameter of the parison so it may be more firmly gripped by the multiple section mold 8. However, if desired, this early air injection may be deleted and reliance placed on other gripping means which will be subsequently described. After the parison is gripped in the mold 8 and severed from the extrusion nozzle 1, the extrusion nozzle is removed from alignment with the mold and a blowhead assembly 11 is aligned therewith in the usual manner.

In order to firmly grip a reduced area of the parison 7, the mold 8 is provided with an annular rim 14 which aids in stabilizing the parison against longitudinal movement thereof during subsequent phases of operation. The parison receiving cavity 16 of the mold 8 includes an upper portion 18, an intermediate or neck-forming portion 20, and a lower portion 22, part of which is not shown. It will be seen that the rim 14 on the mold 8 projects inwardly adjacent the upper extremity of the intermediate cavity portion 20.

The blowhead assembly 11 includes a mandrel 12 which is a composite structure including a circular stem or plunger 24 having a longitudinal blow air passage 26 in the center thereof, and an independently moveable circular collar 28. A hydraulic cylinder arrangement 30 or the like is provided to advance and retract the mandrel stem 24 independently of the mandrel collar 28. The mandrel collar 28 is likewise provided with a hydraulic cylinder arrangement 32 or the like secured to a plate 33 which is connected to a collar base 34 to independently advance or retract the collar 28 relative to the mandrel stem 24. The diameter of the collar 28 is substantially equal to the diameter of the upper portion 18 of the mold cavity 16 and the collar is adapted to be projected into said portion by the extension of the hydraulic means 32.

The process of operation of the present device is as follows: The parison 7 is extruded from the extrusion nozzle 1 and the multiple section mold is closed on the parison so as to close the lower end of the parison and grip the upper end by contact of the rim 14 with the parison. A small charge of air may be injected into the parison through the passage 4 in the orifice tip 2 of extrusion nozzle 1 so as to slightly expand the parison to provide a better grip thereon. Subsequent to this initial air injection, the knife 10 is actuated so as to sever the parison 7 from the extrusion nozzle parent supply. The extrusion nozzle is removed from alignment with the mold 8 and a blowhead assembly 11 is aligned therewith. Both the mandrel stem 24 and collar 28 are advanced by their respective hydraulic arrangements 30, 32, so that the stem 24 acts to compress the upper end of the parison 7 into the upper portion 18 of the mold cavity 16. When the stem 24 assumes the position shown in FIGURE II, approximately at the midpoint of the upper portion 18 of the cavity 16, a limit switch 35 or the like is actuated and further movement of the stem 24 is retarded while advance of the collar 28 is continued by its hydraulic arrangement 32. Such further independent movement of the collar 28 is continued until the lower face 29 of the collar 28 is moved to the lowest extremity of the upper portion 18 of the mold cavity 16, as shown in FIGURE III, and limit switch 36 or the like is actuated. At this point, further advance of the collar 28 is ceased and the mandrel stem 24 is again advanced.

It will be understood that longitudinal compression of the upper portion of the parison is not such as to press-mold the same. Rather, the plasticized material is forced downwardly but inwardly of the upper cavity portion 18 as shown in FIGURE III. However, the lower face 29 of the collar 28 compresses the upper face of the parison to finish form the same and thereby eliminate the necessity of subsequent cutting or finishing operations.

Upon the advance of the stem 24 from the position shown in FIGURE II, air under pressure is injected internally of the parison through the bore 26. This blow air causes the lower end of the parison to expand into contact with the walls of the lower portion 22 of the cavity 16. Subsequent advance of the stem 24 from the position shown in FIGURE III to the position shown in FIGURE IV operates to press mold the neck portion of the bottle in the intermediate portion 20 of the cavity 16 by the generation of substantially radial compressive forces.

It will be seen that longitudinal movement of the entire parison during the press molding longitudinal movement of the stem 24 is inhibited by the formation of a parison lip 38 which is formed by the prior independent longitudinal movement of the collar 28. Further, the injection of air, as suggested in FIGURE III, prior to the press-molding longitudinal movement of the stem 24 in the intermediate cavity portion 20 operates to expand the lower periphery of the parison 7 into contact with the walls 40 of the lower cavity portion 22, which also acts to inhibit entire parison axial movement during the troublesome press-molding stage. Finally, since the compressive forces tending to press-mold the neck portion operate in a substantially radial direction, the tendency for axial slip of the entire parison is reduced.

After the stem 24 is moved to the position shown in FIGURE IV and a cooling cycle is completed, the blow air is exhausted and the mold halves are opened. Subsequently, the blow head assembly 11, with the plastic article still impaled thereon, is raised in any convenient manner to a desired position at which point both the stem 24 and the collar 28 are retracted and the container is thereby rejected. As will be clear to one skilled in the art, conventional automatic means may be provided to perform the various steps of this inventive process in proper sequence.

It will be appreciated that, through the utilization of the present inventive apparatus, the upper face and the internal diameter of a bottle or the like may be press-molded in a finish form. Still further, longitudinal movement of the entire parison in the mold is minimized and uniform bottle wall thickness is induced by the provision of independently and cooperatively significant parison gripping means and the utilization of radially directed compressive press-molding forces.

Various other modifications and alterations will suggest themselves readily to persons skilled in the art. It is intended, therefore, that the foregoing be considered as exemplary only, and that the scope of the invention be ascertained from the following claims.

What is claimed is:

1. Apparatus for forming hollow articles from plastic materials comprising an extrusion nozzle, a multiple section mold having a cavity therein, said cavity being adapted to receive tubular plastic material from said extrusion nozzle, and said cavity comprising an upper portion, an intermediate portion subjacent said upper portion, and a lower portion subjacent said intermediate portion, the diameter of said lower portion being greater than the diameter of said upper and intermediate portions, a rim projecting from said mold into said intermediate portion, the internal diameter of said rim being less than the diameter of the remainder of said intermediate portion, an axially movable mandrel, means for positioning said mandrel over said tubular plastic material when said tubular plastic is situated within said mold cavity, said mandrel comprising an elongated stem having a bore therein, at least a portion of said stem being adapted to be inserted into said cavity, a collar positioned about said stem remote from the lower end thereof, the lateral distance between said stem portion adapted for insertion into the cavity and the outer periphery of the collar being such as to prevent an end portion of tubular plastic material within the cavity from folding over inwardly on itself as said stem portion is inserted into the cavity, the outside diameter of said collar being substantially equal to the diameter of said upper portion of said cavity, and means to move said collar through said upper portion to axially compress tubular material therein and move the same into said intermediate portion.

2. Apparatus for forming hollow articles of plastic material according to claim 1 wherein independent means are provided to move said stem relative to said collar.

3. Apparatus for forming hollow articles from tubular plastic material comprising, a multiple section mold having a cavity therein, said cavity being adapted to receive tubular plastic material from an extrusion nozzle, said cavity comprising an upper portion, an intermediate portion, and a lower portion, the diameter of which is greater than the diameter of said upper and intermediate portions, a composite mandrel, means for positioning said mandrel over a tubular length of plastic material, said mandrel comprising an elongated stem having a portion adapted to be inserted into said cavity, said stem having a longitudinal air passage therein, a collar of increased diameter relative to said stem, the diameter of said collar being substantially equal to the diameter of said upper portion of said cavity, said collar being movably mounted about said stem, the radial distance between said stem portion adapted to be inserted into the cavity and the outer periphery of the collar being such as to prevent an end portion of tubular plastic material within the cavity from folding over inwardly on itself as said stem portion is inserted into said cavity, means to move said collar through said upper portion to axially compress tubular material therein moving the same into said intermediate portion prior to the movement of said stem through said upper portion, and independent means for subsequently moving said stem in said upper and intermediate portions.

4. Apparatus for forming hollow articles from plastic materials according to claim 1 wherein said extrusion nozzle includes an orifice tip having a longitudinal air passage therein adapted to direct pressurized air internally of said tubular plastic material.

5. Apparatus for forming hollow articles from plastic materials according to claim 3 wherein said extrusion nozzle includes an orifice tip having a longitudinal air passage therein adapted to direct pressurized air internally of said tubular plastic material.

6. Apparatus for forming hollow articles from a tubular plastic parison comprising a multiple section mold having a cavity therein, said cavity being adapted to receive a parison from an extrusion nozzle, a composite mandrel means adapted to be inserted in said cavity, said mandrel means comprising a first independently movable means for axially compressing a portion of said parison, and second independently movable means for press molding said portion of said parison, means exterior to said cavity associated with said second independently movable means to retard movement of said second independently movable means after initial advance of said second independently movable means into said cavity, said second independently movable means including longitudinal air passage means for directing air under pressure internally of said parison.

7. Apparatus for forming hollow articles from a tubular plastic parison comprising, a multiple section mold having a cavity therein adapted to receive the parison from an extrusion nozzle, said cavity comprising an upper portion, an intermediate portion, and a lower portion having a diameter greater than the upper and intermediate portions, a composite mandrel means adapted to be inserted in said cavity to shape said parison, said mandrel means comprising first independently movable means for axially compressing said parison and pushing a portion of said parison inwardly of said upper portion of said cavity, second independently movable means for moving said parison portion axially through said first portion of said cavity and for press molding said portion in said intermediate portion of said cavity, means exterior to said cavity associated with said second independently movable means to retard movement of said second independently movable means after initial advance of said second independently movable means into said cavity, and blow air means for injecting air under pressure internally of said parison.

8. Apparatus for forming hollow articles from a tubular plastic parison according to claim 7 wherein said blow air means includes a longitudinal air passage in said second independently movable means.

9. Apparatus for forming a hollow article from a tubular plastic parison comprising partible mold segments adapted to move toward each other to close around an extruded parison, said mold segments when closed having a cavity conforming to the shape of the hollow article, said cavity comprising an upper portion, an intermediate portion adjacent said upper portion, and a lower portion adjacent said intermediate portion, the diameter of said lower portion being greater than the diameter of said intermediate portion, a rim projecting from the portions of the mold segments which form said intermediate portion, the internal diameter of said rim being less than the diameter of the remainder of said intermediate portion, a composite mandrel means adapted to be inserted in said cavity, said mandrel means comprising a first independently movable means for axially compressing a portion of said parison, second independently movable means for further axially compressing said portion of said parison and for forming a lip thereon, said first independently movable means being actuable to press mold said portion and including means to blow mold another portion of said parison, gas flow control means operable in timed relation to movement of said partible mold segments to introduce gas into said parison through said blow mold means of said first independently movable means after said parison has been enclosed by said mold segments and prior to axial compression of said parison portion by said first and second independently movable means to enlarge the parison so as to permit firm gripping thereof by the rim of the closed mold segments.

References Cited
UNITED STATES PATENTS

| | | | |
|---|---|---|---|
| 3,209,401 | 10/1965 | Mehnert | 18—5 |
| 3,224,038 | 12/1965 | Budehesim | 18—5 |
| 3,272,896 | 9/1966 | Winchester | 18—5 X |
| 3,303,249 | 2/1967 | Strauss | 18—5 |
| 3,314,106 | 4/1967 | Latrielle et al. | 18—5 |

WILBUR L. McBAY, Primary Examiner